United States Patent Office … 3,851,007
Patented Nov. 26, 1974

3,851,007
PROCESS FOR THE PREPARATION OF
9-CIS-TRICOSENE
Karl Eiter, Cologne, Germany, assignor to Bayer
Aktiengesellschaft, Leverkusen, Germany
No Drawing. Filed Oct. 10, 1973, Ser. No. 405,195
Claims priority, application Germany, Oct. 11, 1972,
P 22 49 679.3
Int. Cl. C07c *11/00*
U.S. Cl. 260—677 R                 8 Claims

ABSTRACT OF THE DISCLOSURE

A process for the preparation of 9-cis-tricosene comprising reacting an acetylide of an α-acetylene of the formula $$HC{\equiv}C{-}R$$

with a 1-haloalkane of the formula $$Hal{-}R'$$

wherein
one of R and R' is a straight chain alkyl radical of 8 carbon atoms and the other is a straight chain alkyl radical of 13 carbon atoms, and Hal is bromine or iodine, thereby to produce 9-tricosyne, and catalytically hydrogenating the 9-tricosyne thereby to produce 9-cis-tricosene free of 9-trans isomer.

---

The present invention relates to an unobvious process for the preparation of 9-cis-tricosene, "Muscalure," the attractant (pheromone) of the house fly, *Musca domestica*.

In Science 174 (1971), No. 4,004, 76, D. A. Carlson, N. S. Mayer, D. L. Silhacek, D. D. James, Martin Beroza and D. A. Bierl reported on the isolation, identification and synthesis of a sexual bait for house flies. The pheromone was identified in the faeces of the house fly as 9-cis-tricosene and the structure and biological activity of this natural substance was proved by synthesis.

The synthesis of 9-cis-tricosene described in the aforesaid article is rather unsuitable for a simple, cheap, large-scale industrial manufacture of the pheromone. To synthesize the attractant, a component which contains 14 carbon atoms is combined with a component which contains 9 carbon atoms:

$$C_{14}+C_9=C_{23}$$

In this, the coupling of the $C_{14}$ component with the $C_9$ component takes place in a Wittig reaction which, under the conditions described, must always lead to cis-trans mixtures. These mixtures must be separated by very involved, chromatographic methods using silica gel containing silver nitrate. This method of separation presents extreme difficulties on a large industrial scale.

We have now found that 9-cis-tricosene can be prepared industrially, in purely one steric form, in accordance with the two following schematic principles of synthesis. The individual reactants are here only characterized by the number of carbon atoms contained therein.

(a)     $C_{15}+C_8=C_{23}$
(b)     $C_{10}+C_{13}=C_{23}$

The present invention therefore provides a process for the preparation of 9-cis-tricosene comprising reacting an acetylide of an α-acetylene of the formula $$HC{\equiv}C{-}R$$

with a 1-haloalkane of the formula $$Hal{-}R'$$

wherein
one of R and R' is a straight chain alkyl radical of 8 carbon atoms and the other is a straight chain alkyl radical of 13 acrbon atoms, and
Hal is bromine or iodine, thereby to produce 9-tricosyne, and catalytically hydrogenating the 9-tricosyne thereby to produce 9-cis-tricosene free of 9-trans isomer.

Thus, if the method of synthesis (a) ($C_{15}+C_8=C_{23}$) is followed, the $C_{15}$ component required is pentadecyne-(1), which has already been described in the literature, and which, after conversion into an acetylene-metal compound, is linked in a further reaction step to n-octyl bromide (1-bromooctane) as the $C_8$-component, to give 9-tricosyne in excellent yields.

If the method of synthesis (b) ($C_{10}+C_{13}=C_{23}$) is followed, the $C_{10}$-component employed is decyne-(1), which is already known from the literature and which may be prepared from 1-bromooctane, preferably with sodium acetylide, a magnesium halide-acetylide or lithium acetylide. After conversion of the decyne-(1) into the corresponding acetylene-metal compound such as, for example, acetylene-Na, -K, -Li or -MgCl, the product is linked to the known 1-bromotridecane, acting as the $C_{13}$-component, to give 9-tricosyne.

The reduction of 9-tricosyne, which has not previously been described in the literature, by means of a modified Lindlar catalyst, leads to 9-cis-tricosene in quantitative yields.

The process according to the invention for the preparation of 9-cis-tricosene according to the principles of synthesis $C_{15}+C_8=C_{23}$ or $C_{10}+C_{13}=C_{23}$ therefore surprisingly gives high yields of a single steric product. It is known that when carrying out syntheses with acetylene compounds difficulties must be expected. Thus, the formation of an acetylide from an acetylene mono-substituted by a long-chain aliphatic radical is only possible with difficulties. It is therefore surprising that even with such long-chain mono-acetylenes alkylations with longer-chain aliphatic halides can be carried out at the second acetylenic carbon atom. However, only the bromides and iodides are suitable as longer-chain aliphatic hailedes. Methyl-magnesium chloride, sodium amide, sodium hydride or n-butyl-lithium are conveniently used for the preparation of the acetylides.

The acetylides of pentadecyne-(1) or decyne-(1) are preferably prepared in absolute inert solvents, ethers such as tetrahydrofuran or diethyl ether, or in diglyme or liquid ammonia.

The low-boiling solvents used in this reaction are distilled off under an inert gas atmosphere before reaction of the acetaylides with n-octyl bromide or 1-bromotridecane.

The formation of the tricosyne-(9) from the acetylides of pentadecyne-(1) and decyne-(1) and n-octyl bromide or 1-bromotridecane is preferably effected in absolute inert higher-boiling solvents such as diglyme, preferably at temperatures of about 80° C. to 150° C. and especially about 100° C. to 130° C.

At these temperatures, the reaciton takes several hours, about 3 to 8 hours reaction time being sufficient.

Given the difficulties which exist with the conventional means for combating the house fly, for example insecticides, and the difficulties of pollution of the environment occasioned thereby, it is extremely important to be able to use an attractant which attracts the house fly when used in low concentrations.

With the aid of the substance 9-cis-tricosene, the conventional methods for combating this pest can be utilized incomparably more effectively.

The biological activity of the 9-cis-tricosene obtained according to the invention was tested by comparing the attractivity of bait containing 9-cis-tricosene with blank samples, without attractant, towards male house flies (*Musca domestica*). It was found beyond doubt that the baits containing attractant were prefered by the flies.

The process of this invention is illustrated in the following preparative Examples.

EXAMPLE 1

Preparation of tricosyne-(9) from pentadecyne-(1) and 1-bromooctane (i) Use of n-butyl-lithium. 20.8 g. (0.1 mole) of pentadecyne-(1) were dissolved in 100 ml. of absolute diglyme and 44 ml. of a 2.3 molar n-butyl-lithium solution in n-hexane were added dropwise at room temperature under very pure nitrogen. After an initially vigorous reaction, n-hexane was distilled off at up to 90° C. internal temperature under a continuous stream of nitrogen and using a descending condenser. Thereafter, the contents of the flask were warmed to 120° C. for 7 hours and at this temperature 20 g. (0.11 mole) of 1-bromooctane were added dropwise and the mixture was heated to 100–120° C. for a further 8 hours. Working-up gave 37 g. of a colorless, fairly thick oil which distilled from large bulb tubes in a high vacuum (0.001 mm. Hg) at b.p. 130–190° air bath temperature, and on cooling with ice-water gradually solidified completely. The gas chromatogram showed that the tricosyne-(9) was a single substance to the extent of 97%. $n_D^{20} = 1.4546$.

(ii) Use of sodium hydride. 20.8 g. (0.1 mole) of pentadecyne-(1) were dissolved in 50 ml. of absolute tetrahydrofuran (THF) and 3.3 g. (0.11 mole) of 80% strength sodium hydride were added under an atmosphere of very pure nitrogen. The mixture was warmed for 3 hours with the solvent refluxing, 50 ml. of absolute diglyme were then added and all the THF was distilled off at 70° C., under the protection of an inert gas. The suspension which remained was now heated for 7 hours to 110° C. and at this temperature 20 g. (0.11 mole) of n-octyl bromide were added, whereupon a vigorous reaction, with NaBr separating out, indicated that the coupling was taking place. 5 hours' heating at 110° C. brought the reaction to completion. After the customary working-up, 36 g. of crude product (containing a little diglyme) were obtained, passing over, on distillation in a bulb tube in a high vacuum (0.001 mm. Hg) at b.p. 120–180° C. air bath temperature, as an oil which soon solidified. $n_D^{20} = 1.4549$.

(iii) Use of methylmagnesium chloride. The magnesium in 2.5 g. (0.1 gram atom) of magnesium filings was activated, in 50 ml. of a mixture of absolute ether and THF (1:1) by means of a little elementary iodine and $HgCl_2$, and a dry stream of methyl chloride was passed in until, after an induction period, all the magnesium dissolved. Thereafter, 20.8 g. (0.1 mole) of pentadecyne-(1) were added dropwise to the solution of the methyl-magnesium chloride and after addition of 50 ml. of absolute diglyme the mixture of easily volatile solvents was distilled off under nitrogen up to 80° C. internal temperature. After raising the temperature to 110° C., the mixture was heated for a further 4 hours and after adding 20 g. (0.11 mole) of 1-bromooctane and 1.0 g. of $Cu^{I}Cl$ the whole was kept at 100–110° C. for a further 5 hours. After cooling, the mixture was decomposed with ice-cold ammonium chloride solution and the tricosyne-(9) was extracted with ether. 28 g. of crude product were obtained, which distilled in a bulb tube, at b.p. 120–180° C. (air bath temperature)/ 0.001 mm. Hg as a colorless oil which soon solidified on cooling. $n_D^{20} = 1.4545$.

(iv) Use of sodium amide. Sodium was suspended in liquid ammonia to form sodium amide, and pentadecyne-(1) was introduced into the sodium suspension at −30° C. to −40° C. After evaporation of the ammonia, the residue was reacted with 1-bromooctane in absolute diglyme as the solvent. The further processing took place analogously to (i).

EXAMPLE 2

Preparation of tricosyne-(9) from decyne-(1) and 1-bromotridecane 13.8 g. (0.1 mole) of decyne-(1) were dissolved in 80 ml. of absolute diglyme and 44 ml. of a 2.3 molar n-butyl-lithium solution in n-hexane were added under a nitrogen atmosphere while cooling with ice. After slow warming, n-hexane was distilled off using a descending condenser and the remaining contents of the flask were warmed to 120 C. for 5 hours. 26.5 g. (0.11 mole) of 1-bromotridecane were then allowed to run in dropwise and the mixture was heated for 7 hours at 120° C.; after working-up this batch, 35 g. of crude tricosyne-(9) were obtained, and this material could readily be distilled from bulb tubes in a high vacuum. Yield quantitative; $n_D^{20} = 1.4560$.

The tricosyne-(9) was identical form all the above-described preparative processes and showed, in the NMR spectrum at δ=2.15 p.p.m. (4H/m.), a multiplet characteristic of —C≡C—CH$_2$—CH$_2$-protons; the methyl protons appear at 0.90 p.p.m. (6H) as a triplet, while around 1.35 p.p.m. the signals for 17 methylene groups are to be found as a multiplet. The IR spectrum contains 4 characteristic bands, namely 1,462 cm.$^{-1}$ (strong), 1,380 cm.$^{-1}$ and 1,335 cm.$^{-1}$ (weak), and 722 cm. cm.$^{-1}$ (medium-strong). A —C≡C— band is not detectable in the 2,100 cm.$^{-1}$ region (largely symmetrically substituted acetylene). $C_{23}H_{44}$ (molecular weight 320.6) calculated: C, 86.17; H, 13.83. Found: C, 86.3, 86.0; H, 14.2, 14.2.

EXAMPLE 3

Preparation of 9-cis-tricosene 2.83 g. of tricosyne-(9) were dissolved in 25 ml. of low-boiling petroleum ether and 50 ml. of a 1% strength Pd/CaCO$_3$ catalyst, which had been poisoned with 20 mg. of lead acetate per 5 g. of catalyst, were added. The hydrogenation took place over the course of 8 hours and stopped of its own accord after 215 ml. of hydrogen had been absorbed. Working-up yielded 30 g. of crude product which was distilled from a bulb in a high vacuum. After removing a trace of first runnings, the 9-cis-tricosene, b.p. 130;150° C. (air bath temperature)/0.001 mm. Hg, passed over as the main quantity, in the form of a colorless oil of $n_D^{20}$ of 1.4520. In a gas chromatogram, the compound was found to be a single substance to the extent of 98%.

The IR spectrum showed a band at 1,650 cm.$^{-1}$ (weak), which is to be ascribed to the

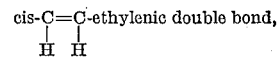

while of the 4 characteristic bands of the acetylenic hydrocarbon tricosyne-(9), only the bands 1,462 cm.$^{-1}$ (strong), 1,378 cm.$^{-1}$ and 720 cm.$^{-1}$ (medium-strong) remained.

The NMR spectrum shows at δ=2.0 p.p.m. the multiplet corresponding to the methylene protons adjacent to the double bond, while at 5.35 p.p.m. the olefinic protons can be perfectly identified as a multiplet. The fact that they must be in the cis-configuration can be seen in particular from the complete absence of a symmetrically substituted

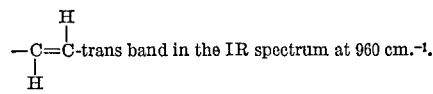

$C_{23}H_{46}$ (molecular weight 322.6) calculated: C, 85.63; H, 14.37. Found: C, 85.10, 85.00; H, 14.60, 14.70.

The biological action was tested with very pure (Z)-9-tricosene on lump sugar and the attractivity of the synthetic product was demonstrated beyond doubt.

It will be appreciated that the instant specification and examples are set forth by way of illustration and not limitation, and that various modifications and changes

What is claimed is:

1. A process for the preparation of 9-tricosyne comprising reacting an acetylide of an α-acetylene of the formula

HC≡C—R with a 1-haloalkane of the formula

Hal—R' wherein one of R and R' is a straight chain alkyl radical of 8 carbon atoms and the other is a straight chain alkyl radical of 13 carbon atoms, and the halogen is bromine or iodine.

2. The process according to claim 1, in which the acetylide is formed by the reaction of the corresponding acetylene with a member selected from the group consisting of methylmagnesium chloride, sodium amide, sodium hydride or butyllithium in an absolute solvent at an elevated temperature.

3. The process according to claim 1, in which the reaction of the acetylide with the 1-haloalkane is effected in a high-boiling inert solvent.

4. The process according to claim 3, in which the high-boiling solvent is absolute diglyme.

5. The process according to claim 1, in which the reaction of the acetylide with the 1-haloalkane is effected at about 80° to 150° C.

6. The process according to claim 1, including the further step of catalytcially hydrogenating the 9-tricosyne thereby to produce 9-cis-tricosene free of 9-trans isomer.

7. A process according to claim 6, in which the catalyst is a Pd/CaCO₃ catalyst containing lead acetate.

8. The process according to claim 7, in which the acetylide is formed by the reaction of the corresponding acetylene with a member selected from the group consisting of methylmagnesium chloride, sodium amide, sodium hydride or butyllithium in an absolute solvent at an elevated temperature, the 1-haloalkane is a 1-bromoalkane and is reacted with the acetylide at about 80 to 150° C. in absolute diglyme.

References Cited

UNITED STATES PATENTS

| | | | |
|---|---|---|---|
| 3,296,321 | 1/1967 | Adams et al. | 260—666 |
| 3,207,804 | 10/1965 | Adams et al. | 260—678 |
| 3,303,225 | 2/1967 | Hsieh et al. | 260—665 |
| 3,420,618 | 1/1969 | Fleming | 260—677 |

DELBERT E. GANTZ, Primary Examiner

J. M. NELSON, Assistant Examiner

U.S. Cl. X.R.

260—666 R, 678